(12) United States Patent
Braganza et al.

(10) Patent No.: US 11,178,284 B2
(45) Date of Patent: Nov. 16, 2021

(54) ELECTRONIC COMMUNICATION SYSTEM FOR PROVIDING EXPERT INFORMATION AND METHOD OF USING SAME

(71) Applicant: Mitel Networks Corporation, Kanata (CA)

(72) Inventors: Jonathan Braganza, Ottawa (CA); Justin Ghantous, Ottawa (CA); Kevin Lee, Kanata (CA)

(73) Assignee: Mitel Networks Corporation, Ottawa (CA)

( * ) Notice: Subject to any disclaimer, the term of this patent is extended or adjusted under 35 U.S.C. 154(b) by 83 days.

(21) Appl. No.: 16/719,787

(22) Filed: Dec. 18, 2019

(65) Prior Publication Data

US 2021/0195030 A1    Jun. 24, 2021

(51) Int. Cl.
*H04M 3/523*    (2006.01)
*G06F 16/9032*    (2019.01)
*G06N 20/00*    (2019.01)
*G06F 16/903*    (2019.01)

(52) U.S. Cl.
CPC .... *H04M 3/5233* (2013.01); *G06F 16/90332* (2019.01); *G06F 16/90344* (2019.01); *G06N 20/00* (2019.01); *H04M 3/5237* (2013.01); *H04M 2203/402* (2013.01)

(58) Field of Classification Search
CPC ............. H04M 3/5233; H04M 3/5237; H04M 2203/402; G06F 16/90332; G06F 16/90344; G06N 20/00
USPC .................................................... 379/265.12
See application file for complete search history.

(56) References Cited

U.S. PATENT DOCUMENTS

| 8,538,955 B2 | 9/2013 | Hu et al. |
| 9,805,320 B2* | 10/2017 | Pattabhiraman ....... G06Q 10/06 |
| 2013/0322613 A1* | 12/2013 | Clayton .............. H04M 3/4935 379/202.01 |
| 2017/0243137 A1 | 8/2017 | Mandel et al. |

* cited by examiner

*Primary Examiner* — Ahmad F. Matar
*Assistant Examiner* — Jirapon Intavong

(57) ABSTRACT

A method and system matching experts or potential experts with an agent request for an expert are disclosed. Exemplary systems include an expert term extraction engine, an agent term extraction engine, and a matching engine to compare agent request terms to the expert terms from the expert term extraction engine and to determine whether there is a match or a potential match between the agent request terms and the extracted expert terms.

20 Claims, 7 Drawing Sheets

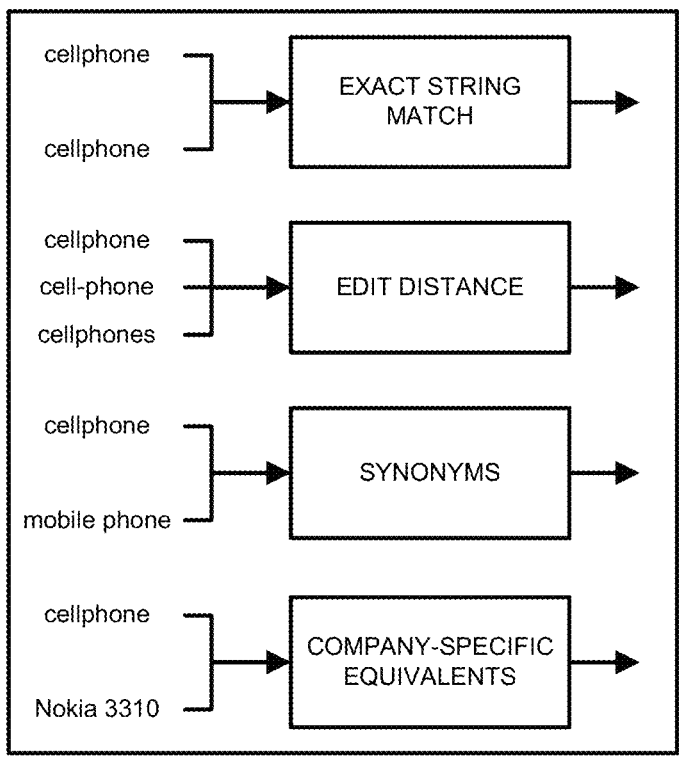

1. Exact String Match

Will only find strings that are exactly the same

2. Edit Distance

Comparison method which calculates the number of letter changes (deletion, insertion, modification) to go from one word to another.

3. Synonyms

Can use internal or external resource that contains synonyms and link them

4. Enterprise-Specific Equivalents

Enterprises can have specific terms or brand names that can be matched to generic and/or equivalent words.

ELECTRONIC COMMUNICATION SYSTEM FOR PROVIDING EXPERT INFORMATION AND METHOD OF USING SAME

FIELD OF THE INVENTION

The present disclosure generally relates to electronic communication methods and systems. More particularly, examples of the disclosure relate to electronic communication methods and systems that can determine expertise associated with personnel based on electronic communication information and match the personnel to a request for expertise.

BACKGROUND OF THE DISCLOSURE

Call centers are often used to receive calls, texts, emails, or other electronic communications. Call centers can be used for a variety of applications, including taking orders, technical support, and the like.

In the case of technical support applications, a customer may have a query regarding a matter. An agent on a communication with or that receives the communication from a customer may not have the requisite or desired expertise to respond to the customer regarding the query. In such cases, the agent may send the query to a known expert (e.g., a person identified in a database as an expert in the field) and try to connect the expert to the communication.

While such techniques are suitable for some applications, the techniques suffer from several shortcomings. For example, such techniques require agents to review a directory for potential experts. However, there is typically relatively little guidance to find who knows the most about the subject. Further, typical databases are relatively static and such databases may not include all areas of expertise and/or particular desired areas of expertise. In such cases, the system would not identify any experts, even if the expertise within a company exists. Further, areas of expertise may be independent of a person's job function and/or background, and thus such areas of expertise may not be entered into the database. Additionally, some professionals may be suitably proficient to handle customer calls outside of their normal role or area of expertise, but may still be in training or otherwise not yet identified as experts. Accordingly, improved systems and methods for identifying experts and matching experts to, for example, call center inquiries, are desired.

Any discussion of problems provided in this section has been included in this disclosure solely for the purposes of providing a background for the present invention, and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

FIG. 7 illustrates exemplary matching techniques in accordance with examples of the disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure relate to electronic communication systems that can, for example, assist an agent with identifying experts or potential experts employed or associated with an enterprise that may be suitable for assisting with a query. While the ways in which the present disclosure addresses various drawbacks of prior systems and methods are described in more detail below, in general, various systems and methods described herein use automated extraction engines to identify areas or potential areas of expertise (skills) requested by an agent, match such areas of expertise (skills) with skills extracted from electronic communications, and provide corresponding information (e.g., name, contact information, and the like) to the agent and/or automatically connect one or more persons identified as having a matched skill or potential matched skill to a communication between the agent and another person.

Figure 1:
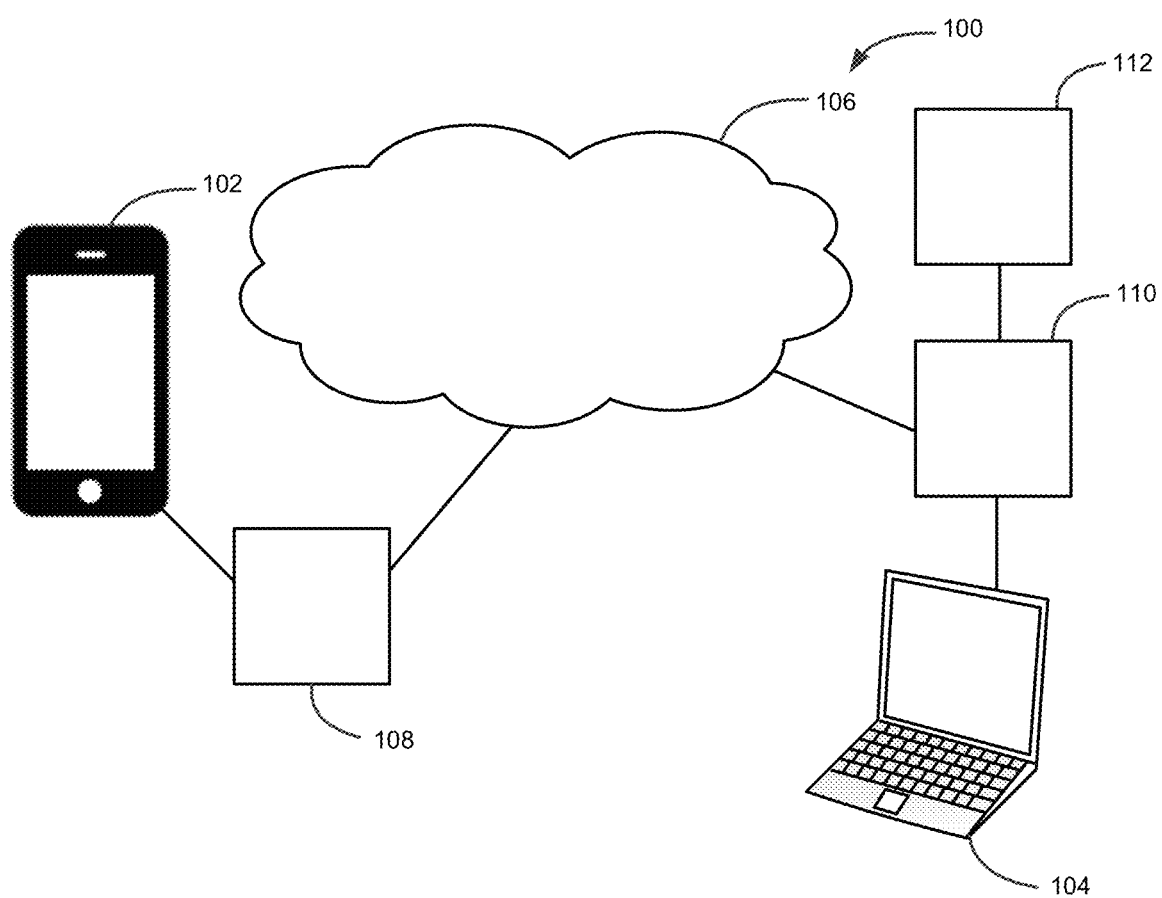
FIG. 1 illustrates an electronic communication system in accordance with exemplary embodiments of the disclosure.

Turning now to the figures, FIG. 1 illustrates an electronic communication system 100 in accordance with exemplary embodiments of the disclosure. For illustration purposes, system 100 is described in the context of a (e.g., corporate or enterprise) call center. However, unless otherwise noted, systems and methods in accordance with embodiments of the disclosure are not so limited. For example, the systems and methods described herein could also be used for hiring processes.

Electronic communication system 100 includes a first device 102 and a second device 104 coupled to a network 106 and an expert skills matching system 110. First device 102 and second device 104 can be used to send electronic communications to each other and/or to other devices connected to network 106. In the illustrated example, system 100 also includes communication servers 108, 112, which can be or include email servers, text servers, chat servers, or the like.

Devices 102, 104 can be or include any suitable device with wired or wireless communication features that can connect to network 106. For example, devices 102, 104 can include a wearable device, a tablet computer, a wired phone, a mobile phone, a personal (e.g., laptop or desktop) computer, a streaming device, such as a game console or other media streaming device, or the like. One or more of devices 102, 104 can include an application or client to perform various functions set forth herein and/or to cause to be displayed text and/or other information as described herein. By way of example, device 102 can be a consumer device and device 104 can be a call agent device.

Network 106 can include or be, for example, an internet protocol (IP) network. Exemplary types of networks suitable for communication with network 106 can be or include a local area network, a wide-area network, a metropolitan area network, wireless networks, a private branch exchange (PBX), or a portion of the Internet. Various components of network 106 can be coupled to one or more other components using an Ethernet connection, other wired connections, and/or wireless interfaces. Network 106 can be coupled to other networks and/or to other devices typically coupled to networks. By way of particular example, network 106 includes a communication network and network 106 can be coupled to additional networks that can be coupled to one or more devices, such as devices 102, 104.

Communication servers 108, 112 can include email servers (incoming and/or outgoing email servers) and, optionally, a domain name server (DNS). Although separately illustrated, communication servers 108, 112 can form part of network 106 or another network.

Expert skills matching system 110 can be used to determine a set of skills within an enterprise, receive (e.g., from an agent using device 104) or determine one or more desired skills (e.g., from a communication with an agent), determine whether matches or likely matches between the one or more desired skills and the set of skills exists, and if a match or potential match exists, send corresponding information to an agent (e.g., to device 104).

Various embodiments of the disclosure provide improved systems over prior systems that may attempt to match skills with desired skills, because examples of the disclosure allow for the automated determination and/or dynamic updating of skills information, without requiring manual input of such information and/or without requiring such skills be predefined.

Figure 2:
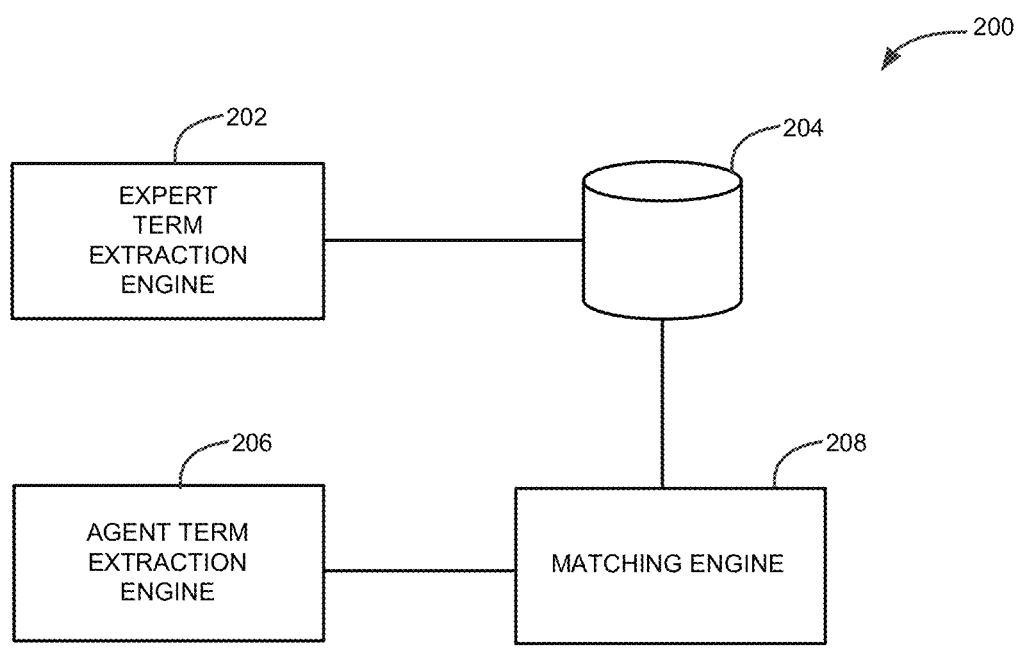
FIG. 2 illustrates a portion of an electronic communication system in accordance with exemplary embodiments of the disclosure in greater detail.

FIG. 2 illustrates an exemplary expert skills matching system 200, suitable for use as expert skills matching system 110, in accordance with various embodiments of the disclosure. Expert skills matching system 200 includes an expert term extraction engine 202, a database 204, an agent term extraction engine 206, and a matching engine 208.

Expert term extraction engine 202, agent term extraction engine 206, and matching engine 208 can each be in the form of a module, or two or more of expert term extraction engine 202, agent term extraction engine 206, and matching engine 208 can be in the form of a module. As used herein, "module" can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices).

Expert term extraction engine 202 can determine and/or be used to determine one or more skills and corresponding information (e.g., employee names, contact information, and the like) associated with the one or more skills. The skills and corresponding information can be stored in database 204.

In accordance with various examples of the disclosure, expert term extraction engine 202 determines (e.g., implicit) expert terms from electronic communications, such as emails, chats, blogs, texts, and the like, of various people associated with an enterprise. For example, expert term extraction engine 202 can mine information from communication servers 108, 112 to extract expert terms that are or may be associated with expert skills. By way of a particular example, communication server 112 can form part of an enterprise network and be mined for expert terms. The expert terms can be determined by, for example, analyzing electronic communication information for one or more users, and reviewing the information for common terms within multiple communications (e.g., 2 or more or 5 or more or 10 or more), common terms within a communication, a frequency of use of a term within a communication or within a plurality of communications, a type of term—e.g., noun or verb, and the like. An exemplary model suitable for use as expert term extraction engine 202 can use natural language processing (NLP) to determine the terms that can be determined using open-source methods such as Stanford NLP (https://nlp.stanford.edu/blog/interactive-language-learning/).

As noted above, database 204 can store expert skills and corresponding information received from expert term extraction engine 202. Corresponding information can include any combination of: contact information of the person(s) associated with the skill, presence information for the person(s), title, length of time the person(s) has/have been associated with the enterprise, known skills, potential expert information (e.g., name, contact information, potential skills, and the like for a person associated with a potential match as determined by matching engine 208), and the like.

Agent term extraction engine 206 can determine and/or be used to determine one or more skills desired by an agent—e.g., to assist with a communication between the agent and another person, such as a customer.

In accordance with various examples of the disclosure, agent term extraction engine 206 determines (e.g., implicit) expert terms from an electronic communication, such as an active electronic communication. The active electronic communication can be, for example, an audio call, a video call, a chat, an email, or the like. Agent term extraction engine 206 can mine information from the agent's communication (e.g., via communication server 112) to extract terms that are or may be associated with expert skills. Agent request terms can be determined by, for example, analyzing agent electronic communication information (e.g., between an agent and a customer) and reviewing the information for common terms. An exemplary model suitable for modification for use as expert term extraction engine 202 can include natural language processing (NLP), such as the model described above. Additionally or alternatively, an agent can submit expert terms (e.g., by speaking or typing the terms) using an agent client on device 104.

Matching engine 208 can be used to determine whether a match or potential match exists between terms extracted using expert term extraction engine 202 and terms extracted using agent term extraction engine 206. Exemplary techniques to determine matches and potential matches are illustrated in FIG. 7. Exact matches can be determined by comparing the expert terms extracted using expert term extraction engine 202 and agent request terms extracted using agent term extraction engine 206 and determining whether there is an exact match between the expert and agent request terms. If no exact match is found, potential matches can be determined using a variety of techniques, including allowing for an edit distance, allowing for synonyms, allowing for predefined equivalents, and/or scoring the potential matches and using threshold to define a potential match. With edit distance, a predefined number of spaces or characters can be set to allow for that number of spaces or character differences between expert terms extracted using expert term extraction engine 202 and agent request terms extracted using agent term extraction engine 206. Synonyms can be set, or matching engine 208 can include or be coupled to a thesaurus and/or dictionary, to allow review of terms and words that may be synonyms. If synonyms of expert terms extracted using expert term extraction engine 202 and/or agent request terms extracted using agent term extraction engine 206 match, then a match or potential match can be indicated to the agent. Similarly, (e.g., enterprise) predefined equivalents can be used to determine whether a match between agent and expert terms is found. For example, the terms cloud and server can be predefined as equivalents and if one of the agent and expert terms includes cloud and the other of the agent and expert terms includes server, a match or potential match can be presented to the agent on the agent device.

If a potential match is determined, the potential match and a corresponding score can be presented to the agent using the agent device. A score can be based on, for example, a number of times a term is used in an agent communication, whether the agent request term and the expert term have been previously found to be a match, a number of times a term is found in an expert or potential expert communication, types of expert/potential expert communications the terms are found in (e.g., resumé, chat, email, training material, biography, etc.) or the like. For example, an exact match can be given a score of 100%; a match to a synonym can be given a score of 95%; matching or two or more terms can be given a score of 90%; a match of a single term can be given a score of 75%. A threshold of, for example, greater than 50%, greater than 75%, greater than 80%, greater than 90%, or the like can be set. If a score associated with a potential match is below a set threshold, the potential match may not be sent to or displayed to the agent. If a potential match is above a set threshold, the potential match information and the score can be displayed to the agent, so that the agent can determine whether to use such information. A top number (e.g., 1, 3, 5 . . . ) of experts or potential experts (e.g., with the highest scores) can be displayed to an agent. In some cases, a querying technique, such as hovering over the expert, can show the expert's name, title, and/or other corresponding information, including presence information.

In accordance with examples of the disclosure, once the experts/potential experts have been determined for a conversation, an agent can click on their avatar to contact them and/or connect them to the electronic communication (e.g., call or chat). A request to the expert can be by, for example, a chat bubble in their back office chat application with a small excerpt of the conversation and accept and decline buttons. If the expert chooses to accept the invitation, the expert will also be added to the agent's conversation as an observer. The expert can then type messages which are "whispered" to the agent. The customer may not see these messages. If the agent chooses to send a message to the expert without the customer seeing the message, they can use the "/whisper" command. Once the conversation has completed, the agent can choose to increase or decrease the expert's overall score for that topic. If the expert declines the conversation, they can select a pre-typed response to indicate they are not an expert, which will lower their score (and such information can be saved in a database, as described herein). An expert can also provide other responses to indicate why they cannot accept (i.e., busy, in meeting, etc.). This would not affect their overall score. This would temporarily remove this expert from being offered as a recommended expert for the conversation. From the agent's perspective, this expert is removed from the list of experts and the next expert in line could be added to the list.

Figure 3:
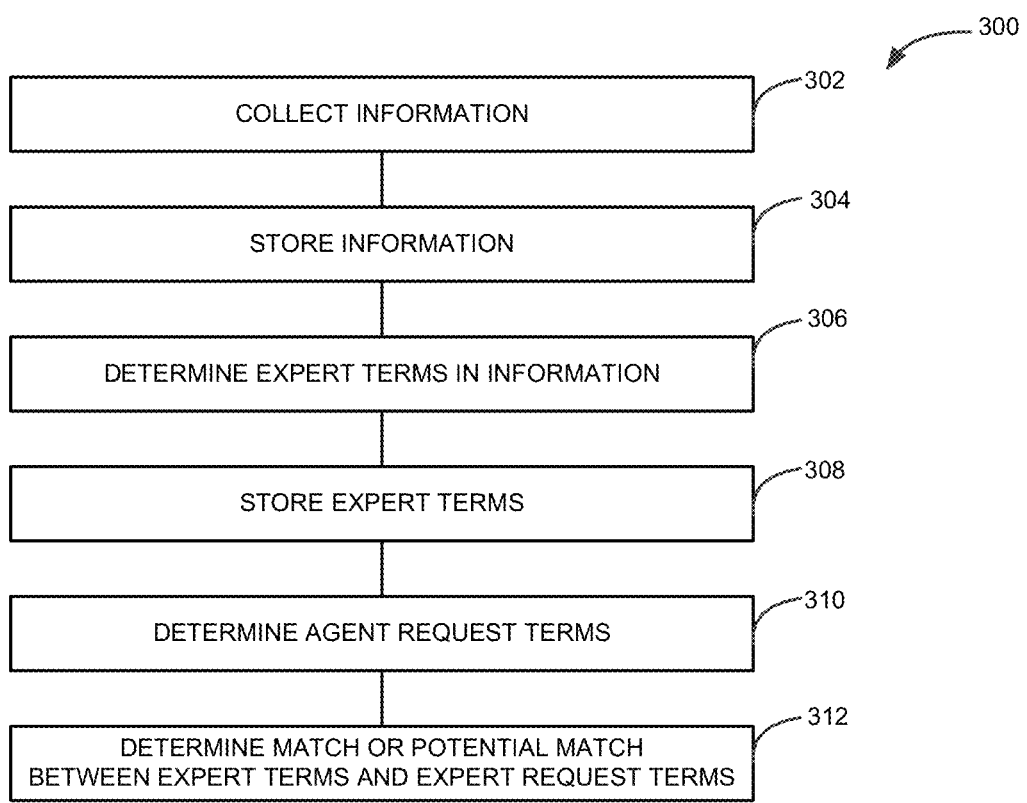
FIG. 3 illustrates a method of using an electronic communication system in accordance with exemplary embodiments of the disclosure.

FIG. 3 illustrates a method 300 in accordance with examples of the disclosure. Method 300 includes the steps of collecting information (step 302), storing information (step 304), determining expert terms (step 306), storing expert terms (step 308), determining agent request terms (step 310), and determining matches and/or potential matches (step 312).

Collecting information step 302 includes collecting electronic communication information from one or more potential experts (which can include experts). The information that is collected can include electronic communications, such as texts, emails, chats, blogs, and the like. For example, electronic communications between one or more users associated with an enterprise (e.g., using communication server 112) can be collected.

Information collected during step 302 can be stored during step 304. The information can be stored in a database that is coupled to or that forms part of a communication server, such as communication server 112. The information collected during step 302 can be indexed by user name, date, type of communication, and the like.

During step 306, expert terms are determined. The expert terms can be determined using, for example, expert term extraction engine 202, described above.

Once the expert terms are determined, the expert terms are stored—e.g., in database 204. As noted above, additional, corresponding information, including names, contact information, and the like can also be stored with the expert terms.

At step 310, agent request terms are determined. The agent request terms can be determined using agent term extraction engine 206 and/or can be input by an agent—e.g., using a client on an agent device, such as device 104.

During step 312, a determination of whether a match is found between one or more expert terms stored during step 308 and agent request terms determined during step 310 is made. If a match is determined, expert information (e.g., a list of one or more experts and corresponding skills, and contact information) is presented to the agent—e.g., on device 104. If no match is found, such information can be presented to the agent. If a potential match is found, then information corresponding to the potential match (e.g., the agent request term, the expert term(s) and the corresponding information for the experts corresponding to the matched expert terms) can be presented to the agent using the agent device.

In the case of potential matches, if a potential match is presented to an agent, and the agent determines the potential match is an actual match, the agent can update the database (e.g., database 204) to reflect a 100% confidence level for the agent request term and the expert term. Additionally or alternatively, an enterprise database can be updated to reflect that the agent request term and the expert term are synonyms for the same skill.

Figure 4:
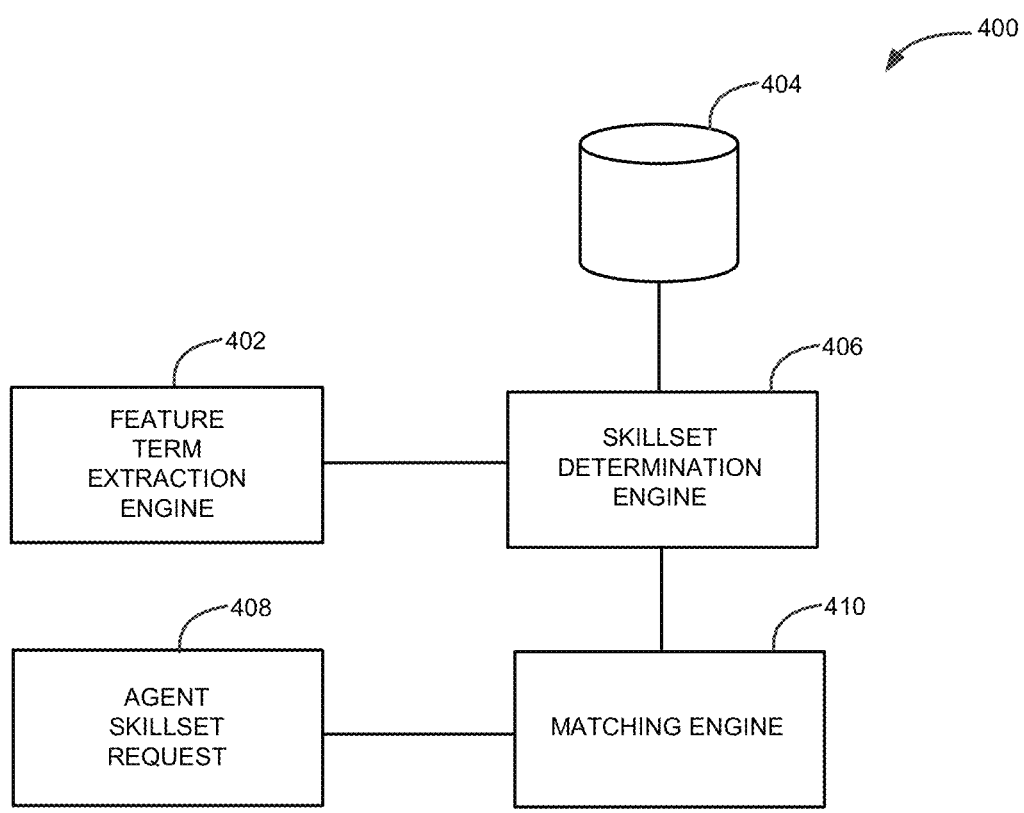
FIGS. 4 and 5 illustrate a portion of an electronic communication system in accordance with additional exemplary embodiments of the disclosure.

FIG. 4 illustrates another expert skills matching system 400, suitable for use as expert skills matching system 110, in accordance with various embodiments of the disclosure. Expert skills matching system 400 can be used when, for example, at least some expert terms are known—e.g., either defined by an enterprise and/or determined using an expert term extraction agent, such as expert term extraction agent 202. Expert skills matching system 400 can be used to learn additional skills and to identify additional experts.

Expert skills matching system 400 includes a feature term extraction engine 402, a database 404, a skillset determination engine 406, an agent term extraction engine 206 or request 408, and a matching engine 410. Feature term extraction engine 402, skillset determination engine 406, agent term extraction engine 206, and matching engine 410 can each be in the form of a module, or two or more of feature term extraction engine 402, skillset determination engine 406, agent term extraction engine 206, and matching engine 410 can be in the form of a module.

Feature term extraction engine 402 determines features, such as terms, words, styles, or the like in electronic communications associated with users—e.g., users within an enterprise and/or connected to or within a network. Features can be determined using, for example, an NLP model, such as the model noted above.

Feature terms extracted using feature term extraction engine 402 can be used to determine skills using skillset determination engine 406. In accordance with examples of the disclosure, skillset determination engine 406 compares known expert skills with features retrieved via feature term extraction engine 402 to build a model for skillset determination. Then, during operation, features extracted using feature term extraction engine 402 are converted into skills, which can be compared to agent request terms extracted using agent term extraction engine 206 or to request 208.

Figure 5:
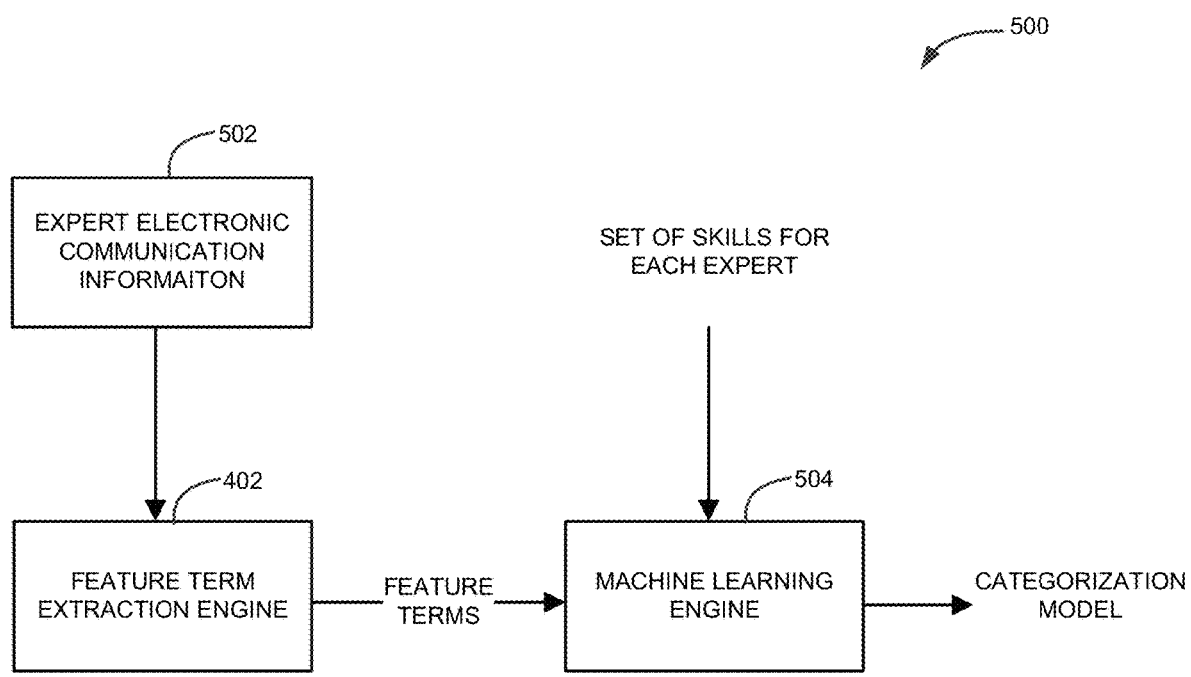

FIG. 5 illustrates an exemplary learning system 500 in accordance with examples of the disclosure. Learning system 500 can form part of expert skills matching system 400. Learning system 500 includes expert electronic communication information 502, feature term extraction engine 402, and machine learning engine 504. Information from expert electronic communication information 502 is fed to feature term extraction engine 402 to extract features. The feature terms are used by machine learning engine 504 to form a model that can determine skills based on the extracted feature terms.

Agent skillset requests can include an agent entering a skillset request or can include an agent request term generated by an agent term extraction engine, such as agent term extraction engine 206.

Matching engine 410 can be the same or similar to matching engine 208.

Figure 6:
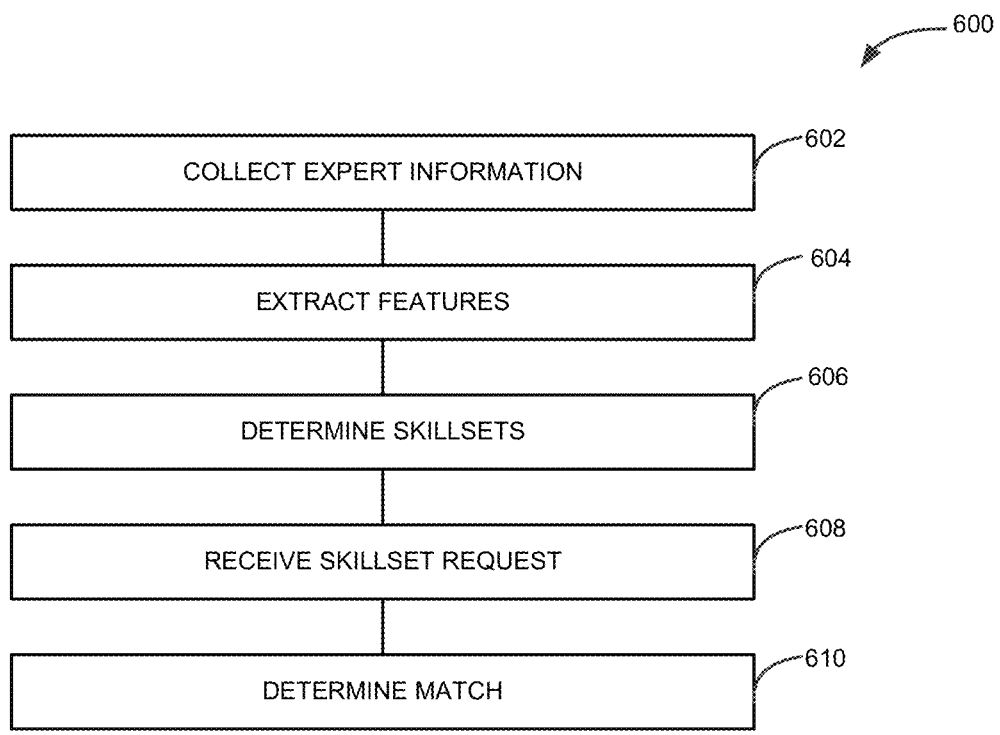
FIG. 6 illustrates a method of using an electronic communication system in accordance with further exemplary embodiments of the disclosure.

FIG. 6 illustrates a method 600—e.g., of using expert skills matching system 400—in accordance with examples of the disclosure. Method 600 includes the steps of collecting expert information (step 602), extracting features (step 604), determining skillsets (step 606), receiving a skillset request (step 608), and determining a match (step 610).

Collecting expert information step 602 can be the same or similar to collecting information step 302, described above. During extracting features step 604, features are extracted from expert information collected during step 602. The features can be extracted using feature term extraction engine 402. The extracted feature terms can then be fed to a machine learning engine, such as machine learning engine 504, during step 606 to determine skills based on the extracted feature terms. Once the skills are determined, a match can be determined—e.g., using matching engine 410. Step 610 can be the same or similar to step 312 and can include determining a match, potential match, or no match, as described above. Exemplary methods can also include providing information, such as match information, potential match information, corresponding information, and the like to an agent device.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

We claim:

1. An electronic communication system comprising:
   a database storing records for personnel associated with an enterprise;
   one or more communication servers storing electronic communications between the personnel associated with the enterprise;
   an expert term extraction engine, provided by a server, communicatively linked to the one or more communication servers, executing computer program instructions, processing the electronic communications to extract expert terms, each being associated with a skill, and to update the records of the personnel linked to the electronic communications from which the expert terms were extracted to include the skills;
   an agent term extraction engine to extract agent request terms from one or more agent electronic communications between an agent of the enterprise and a customer of the enterprise; and
   a matching engine, provided by a server executing computer program instructions, accessing the database to compare the agent request terms to the expert terms to determine whether there is a match or a potential match and to output information from one or more of the records associated with the match or the potential match to the agent.

2. The electronic communication system of claim 1, wherein the database stores the expert terms, the database coupled to the matching engine.

3. The electronic communication system of claim 1, wherein the matching engine determines a score associated with the match or the potential match and wherein the score is included in the information provided to the agent.

4. The electronic communication system of claim 3, further comprising a database comprising the score.

5. The electronic communication system of claim 1, further comprising an agent device, wherein the agent device receives the information from the matching engine and displays a list of one or more potential experts.

6. An electronic communication system comprising:
- a database storing records for personnel associated with an enterprise;
- one or more communication servers storing electronic communications between the personnel associated with the enterprise;
- a feature term extraction engine, provided by a server, communicatively linked to the one or more communication servers, executing computer program instructions, processing the electronic communications to extract feature terms;
- a skillset determination engine to compare the feature terms to one or more of predefined skillsets to identify matches and to update the records of the personnel linked to the electronic communications from which the feature terms were extracted to include the one or more predefined skillsets; and
- a matching engine to compare the one or more predefined skillsets in the records to an agent skillset request or an agent request term and to determine whether there is a match or a potential match among the personnel associated with the enterprise.

7. The electronic communication system of claim 6, further comprising an agent term extraction engine to extract agent request terms from one or more agent electronic communications.

8. The electronic communication system of claim 6, further comprising a database comprising the predefined skillsets.

9. The electronic communication system of claim 6, further comprising a database comprising known expert skills.

10. The electronic communication system of claim 6, further comprising a machine learning engine to generate a model based on the feature terms and known expert skills, wherein the model is used by the skillset determination engine to compare the feature terms to one or more of predefined skillsets.

11. An electronic communication method for providing expert information, the electronic communication method comprising the steps of:
- using an expert term extraction engine, provided by a server, communicatively linked to the one or more communication servers, executing computer program instructions, determining expert terms from one or more potential expert electronic communications between personnel of an enterprise;
- determining agent request terms from one or more agent electronic communications between an agent of the enterprise and a person outside the enterprise; and
- using a matching engine, provided by a server executing computer program instructions, comparing the agent request terms to the expert terms and to determine whether there is a match or a potential match.

12. The electronic communication method for providing expert information of claim 11, further comprising a step of collecting potential expert information.

13. The electronic communication method for providing expert information of claim 12, further comprising a step of storing the potential expert information.

14. The electronic communication method for providing expert information of claim 11, wherein the step of using a matching engine comprises determining a score associated with the potential match.

15. The electronic communication method for providing expert information of claim 14, further comprising a step of displaying a list of potential experts and associated scores on an agent device, wherein the potential experts are selected from the personnel of the enterprise based on the match or the potential match.

16. The electronic communication method for providing expert information of claim 11, further comprising a step of displaying a list of experts on an agent device, wherein the experts are selected from the personnel of the enterprise based on the match or the potential match.

17. The electronic communication method for providing expert information of claim 11, wherein the step of determining agent request terms comprises receiving one or more agent request terms from a client on an agent device.

18. The electronic communication system of claim 1, wherein the processing of the electronic communications to extract the expert terms comprises analyzing information from the electronic communications for at least one of: common terms within multiple communications, common terms within a single one of the electronic communications, a frequency of use of a term within a one or more of the electronic communications, and a type of term.

19. The electronic communication system of claim 1, wherein the matching engine determines presence of the potential match using one or more of: edit distance, synonyms, predefined equivalents, and comparison of scores assigned to each potential match and a predefined threshold score.

20. The electronic communication system of claim 3, wherein the score is determined by the matching engine based on at least one of: a number of times a term is used in the one or more agent electronic communications, whether the agent request terms and the expert terms have previously been found to be a match, a number of times a term is found in the electronic communications between the personnel associated with the enterprise, and a type of communication associated with the electronic communications between the personnel associated with the enterprise in which a term is found.

* * * * *